US008319123B2

(12) United States Patent
Faulkner et al.

(10) Patent No.: US 8,319,123 B2
(45) Date of Patent: Nov. 27, 2012

(54) SYSTEM, NETWORK PROTECTOR ENCLOSURE, AND AUTOMATIC RACKING SYSTEM

(75) Inventors: Mark A. Faulkner, Greenwood, SC (US); Stephen W. Oneufer, Greenwood, SC (US); Stephen R. Cason, Bradley, SC (US)

(73) Assignee: Eaton Corporation, Cleveland, OH (US)

( * ) Notice: Subject to any disclaimer, the term of this patent is extended or adjusted under 35 U.S.C. 154(b) by 414 days.

(21) Appl. No.: 12/717,262

(22) Filed: Mar. 4, 2010

(65) Prior Publication Data

US 2011/0216508 A1 Sep. 8, 2011

(51) Int. Cl.
*H01H 9/20* (2006.01)
*H05K 5/00* (2006.01)

(52) U.S. Cl. .............. 200/50.24; 200/50.21; 361/606; 361/614; 361/724

(58) Field of Classification Search ............... 200/50.24, 200/50.25
See application file for complete search history.

(56) References Cited

U.S. PATENT DOCUMENTS

| | | | |
|---|---|---|---|
| 3,947,728 A | 3/1976 | Smith | |
| 4,017,698 A | 4/1977 | Kuhn et al. | |
| 4,761,521 A | 8/1988 | Beck et al. | |
| 5,453,587 A | 9/1995 | Hurley et al. | |
| 5,477,017 A | 12/1995 | Swindler et al. | |
| 5,822,165 A | 10/1998 | Moran | |
| 6,504,693 B1 | 1/2003 | Moffat et al. | |
| 6,777,627 B1 * | 8/2004 | Stevenson | 200/50.21 |
| 6,897,388 B2 | 5/2005 | Greer | |
| 6,951,990 B1 * | 10/2005 | Miller | 200/50.21 |
| 7,019,230 B1 | 3/2006 | Vaill et al. | |
| 8,179,696 B2 * | 5/2012 | Coomer et al. | 361/819 |
| 2009/0014291 A1 | 1/2009 | Stevenson | |
| 2009/0301851 A1 | 12/2009 | Morris et al. | |

OTHER PUBLICATIONS

Honeywell International Inc., "Solid State Sensors Digital Magnetoresistive Sensor" 2SS52M Series, MICRO SWITCH Sensing and Control, 2010, 2 pp.
INSUL-8 Corporation, "60 Series Pistol Grip Pendant", 2010, p. 22.

* cited by examiner

*Primary Examiner* — Anthony Q Edwards
(74) *Attorney, Agent, or Firm* — Eckert Seamans Cherin & Mellott, LLC; Kirk D. Houser (57) ABSTRACT

A system includes an electrical enclosure having an inner volume and a door structured to open to expose the inner volume and structured to close to enclose the inner volume. A racking mechanism is disposed in the inner volume and includes a member movable in a first direction to a first position and an opposite second direction to a different second position. A network protector is carried by the racking mechanism and is movable thereby between a connect position in the inner volume corresponding to the first position of the member of the racking mechanism, and a test position in the inner volume corresponding to the different second position of the member of the racking mechanism. A control mechanism is structured to move the member of the racking mechanism between the first position and the different second position of the member responsive to a number of remote commands.

20 Claims, 9 Drawing Sheets

SYSTEM, NETWORK PROTECTOR ENCLOSURE, AND AUTOMATIC RACKING SYSTEM

BACKGROUND

1. Field

The disclosed concept pertains generally to network protectors and, more particularly, to network protectors carried and movable by a racking mechanism. The disclosed concept further pertains to network protector systems. The disclosed concept also pertains to automatic racking systems for electrical switching apparatus.

2. Background Information

Circuit breakers for medium voltage switchgear apparatus applications are generally housed in metal enclosures and are removable. The apparatus typically includes at least one levering-in mechanism or device to move a circuit breaker between a disconnect position, in which the primary contacts of the circuit breaker are fully disengaged from the mating primary contacts within the enclosure, and a connect position, in which the primary contacts of the circuit breaker and enclosure are fully engaged. Levering-in and levering-out/withdrawing of a circuit breaker can be accomplished by using a detachable hand crank, which is inserted into the levering-in mechanism to move the circuit breaker within its cell as a function of turning the crank.

Typically, power is provided to auxiliary devices and control circuitry through mating secondary contacts mounted with the circuit breaker in the enclosure. At some point during movement of the circuit breaker from the disconnect position to the connect position, the respective secondary contacts must be engaged in order that power is provided to the auxiliary devices and the control circuitry. When the secondary contacts are engaged, but the primary contacts are disengaged or disconnected, the auxiliary functions of the circuit breaker can be safely tested since the circuit breaker is not energized.

Low voltage secondary power distribution networks consist of interlaced loops or grids supplied by two or more sources of power, in order that the loss of any one source will not result in an interruption of power. Such networks provide the highest possible level of reliability with conventional power distribution and are, normally, used to supply high-density load areas, such as a section of a city, a large building or an industrial site.

Each source supplying the network is typically a medium voltage feeder system including a switch, a voltage reducing transformer and a network protector. As is well-known, a network protector is an apparatus used to control the flow of electrical power to a distribution network. The network protector includes a low voltage circuit breaker and a control relay which opens the circuit to the transformer upon detection of abnormal current flow. Specifically, the control relay typically senses the network voltages, the line currents and the phasing voltage, and executes algorithms to initiate circuit breaker tripping or re-closing actions. Trip determination is based on detecting reverse power flow, that is, power flow from the network to the primary feeder. Examples of network protector relays are disclosed in U.S. Pat. Nos. 3,947,728; 5,822,165; 5,844,781; and 6,504,693, which are incorporated by reference herein.

A network system is a redundant power delivery system including a plurality of primary feeders and associated network protectors. The transformer secondaries are electrically tied together, which increases the available fault current.

Network protectors are typically used in the enclosed spaces of underground vaults. Since about 1922, network protectors have been installed in underground concrete vaults in major city centers. Since that time, such network protectors were designed as a switch that was bolted in place and required manual removal from the corresponding enclosure. The relatively extreme environment of a network protector demanded special components. As a result, standard power circuit breakers were not utilized. In about 1999, the assignee of the disclosed concept developed a network protector with a power circuit breaker suitable for that environment. This power circuit breaker included a relatively high temperature composite housing and a robust mechanism for operation. Subsequently, the assignee's power circuit breaker included a removable, four position, draw-out power circuit breaker as part of the network protector. However, actuation of the draw-out mechanism requires direct user involvement in the environment of the network protector vault. Therefore, it is believed that known network protectors require a worker to manually draw-out or manually unbolt and physically remove the network protector.

However, as a result, the worker can be exposed to arc flash hazards, which can cause equipment damage, serious bodily injury or even death if done improperly. A worker performing network protector manipulation is in physical proximity with the network protector. Therefore, the workers are typically required to wear approved personal protection equipment (PPE) to resist serious injury or death that could result if an electrical failure were to occur during racking/draw-out/draw-in operations. However, PPE is generally bulky, hot and uncomfortable, which dissuades workers from wearing it.

U.S. Pat. No. 4,017,698, which is expressly incorporated by reference herein, discloses an automatic circuit breaker in a draw-out unit removably mounted within an enclosure. A levering mechanism is provided to manually lever out the draw-out unit on rails to permit complete disengagement of the circuit breaker from load and line terminals mounted within the enclosure without requiring unbolting operations. The levering mechanism is employed to operate the draw-out unit between engaged and disengaged positions. The levering mechanism comprises a mounting bracket welded to a channel member of a main support frame. A drive shaft including a worm gear extends through the mounting bracket in a direction perpendicular to the channel member. One end of the drive shaft is threaded into a square traveling nut which is located by a square aperture in the rear of the mounting bracket. The end of the drive shaft opposite the threaded end includes a pin which can be engaged by a cooperating socket at the end of a manual operating crank. A levering shaft extends through two side support plates and through the mounting bracket in a direction perpendicular to the drive shaft. Mounted upon the levering shaft within the mounting bracket is a main gear which is engaged by a worm gear. Also, mounted upon the levering shaft is an interlock cam which cooperates with a shutter pivotally secured to the mounting bracket to provide a safety interlock for the operating crank. At each end of the levering shaft is an engaging lever containing a roller. The levers and rollers cooperate with "J" shaped hooks mounted upon the enclosure. A spring-loaded pivot plate is mounted at the top of the mounting bracket and serves to prevent the raising of the shutter unless lifted by a protective barrier, or otherwise displaced.

In order to operate the draw-out unit from a disengaged fully rolled out position to a fully engaged position, the draw-out unit is manually rolled back along the rails into the enclosure until the rollers contact the rear edge of the J shaped hooks. In this position, disconnect structures are still physically separated from corresponding terminals. The shutter is then raised to allow insertion of the operating crank and engagement of the drive shaft. The crank is then manually operated to cause counterclockwise rotation of the drive shaft. The attached worm gear also rotates in a counterclockwise direction to cause corresponding counterclockwise rotation of the levering shaft and levers. The rollers will move downward into the slot of the J shaped hooks, pulling the draw-out unit into the enclosure. Continued manual rotation of the operating crank will cause continued rotation of the levers, pulling the draw-out unit into a completely engaged position within the enclosure. In this position, the disconnect structures engage the corresponding terminals. As the crank is manually rotated, the traveling nut is constrained by the square aperture in the mounting bracket and is drawn inward along the threaded end of the drive shaft. When the draw-out unit reaches the fully engaged position, the threaded end of the drive shaft contacts the bottom of the traveling nut, effectively preventing further rotation of the crank and drive shaft.

U.S. Pat. No. 6,897,388 discloses a portable circuit breaker racking apparatus including a housing having a base and a frame extending upwardly from the base. A wheel structure is coupled to the base to permit wheeled movement of the housing. A motor mount structure is coupled to the frame for generally vertical movement toward and away from the base. An electric motor, preferably a gear motor, is fixedly mounted to the motor mount structure. The motor has a rotatable shaft and an adaptor structure is operatively associated with the shaft. The adaptor structure is coupled directly to the shaft and is constructed and arranged to be coupled to a circuit breaker. A digital encoder is associated with the motor to track a position of the shaft of the motor and thus the position of the circuit breaker when coupled to the adaptor structure. Due to different circuit breaker designs having different elevation locations of racking, the apparatus includes an elevation adjustment feature.

The motor is controlled by a programmable logic controller (PLC). A cable electrically connects the motor with the controller. Operation of the PLC is achieved via an operator control station that communicates with the PLC at a cable to operate the PLC via a location remote from the circuit breaker when coupled with the apparatus. The cable has a length of about 40 feet to ensure that the operator can be a safe distance (e.g., per NFPA 70E) from the circuit breaker when moving the circuit breaker. Instead of using the cable, wireless communication can be employed between the control station and the PLC. The control station includes "raise" and "lower" buttons to control the motor. The position of the circuit breaker, coupled to the apparatus via an adaptor structure, is tracked by a digital encoder, preferably located on a fan portion of shaft of the gear motor. As the gear motor turns, the encoder sends ten pulses per revolution of the motor to the PLC. The encoder and the PLC allow the creation of a linear counter. As the motor rotates, it rotates the racking mechanism of the circuit breaker to cause the circuit breaker to move forward or backward in its cell housing. Therefore, for each rotation of the motor, the circuit breaker moves in or out a certain number of inches.

A "torque profile" protection utilizes the linear counter to provide an accurate location of the breaker during the racking process. A variable frequency drive is used to provide current or torque feedback from the motor to the PLC on a continuous basis. A torque profile generator program of the PLC generates an initial torque profile for each circuit breaker by establishing profile position points along the travel distance. Typically, 100 equal increments or number of encoder pulses are used. Using the linear counter, the program identifies the profile position point, checks the current or torque value and stores the information in the PLC memory for that particular circuit breaker. The PLC checks the variable frequency drive and stores the gear motor current value that corresponds to the breaker location or encoder pulse count. The gear motor current is a direct representation of torque. As the breaker is moved, the linear counter changes. At the next profile position point, the current or torque is checked and stored. This is done approximately 100 times between the positions of the breaker.

Once the torque profile of a breaker is generated and stored in memory, it is used as a reference for any future operations of the circuit breaker. The same profile position points used in generating the torque profile are used in monitoring the torque profile. In monitoring the torque profile, the linear counter is used to determine when the breaker is at a profile position point. When the breaker reaches a profile position point, the present motor current or torque is compared to the motor current or torque stored as a reference or as a base line. If the present value is larger than the stored value, the program initiates an over torque stop of the system.

The use of digital encoder positioning, current monitoring, and programmable logic control allow for program generation of a torque profile for each classification and/or type of medium voltage circuit breaker. The combination of the torque profile, position sensing of the circuit breaker and current monitoring give exact, accurate and extremely fast monitoring and protection of the circuit breaker and its cell housing. The apparatus advantageously knows the position of the circuit breaker at and between the connected and disconnected positions thereof at all times, without having to add some device in each breaker switchgear cell. The apparatus eliminates the need for operators to be within the "flash boundary" as defined by NFPA 70E and the requirement to wear specified personal protective equipment. The apparatus enhances operator safety and maintains precise monitoring and protection of the breakers and cell housings.

SUMMARY

It is believed that remote automatic racking has never been used on network protectors.

There is, therefore, a need for a racking device for a network protector which device may be remotely operated.

This need and others are met by embodiments of the disclosed concept, which provide a racking mechanism that works in isolation with the door of the network protector enclosure being safely closed. This provides the worker with complete protection from exposure to energized bus work, which is internal to the network protector enclosure. Due to the nature of network systems with relatively high available secondary fault current, keeping users out of the enclosed space of a network protector vault environment greatly improves worker safety.

In accordance with one aspect of the disclosed concept, a system comprises: an electrical enclosure including an inner volume and a door structured to open to expose the inner volume and structured to close to enclose the inner volume; a racking mechanism disposed in the inner volume of the electrical enclosure, the racking mechanism including a member movable in a first direction to a first position and an opposite second direction to a different second position; a network protector carried by the racking mechanism and being movable thereby between a connect position in the inner volume of the electrical enclosure corresponding to the first position of the member of the racking mechanism, and a test position in the inner volume of the electrical enclosure corresponding to the different second position of the member of the racking mechanism; and a control mechanism structured to move the member of the racking mechanism between the first position and the different second position of the member responsive to a number of remote commands.

The control mechanism may comprise: a motor; a gear box assembly driven by the motor, the gear box assembly comprising a number of gears having a position, an output shaft driven by the number of gears, and a plurality of magnets disposed about one gear of the number of gears; a sensor responsive to the plurality of magnets; and a controller including an input from the sensor, and an output to power the motor, the controller being structured to determine the position of the one gear of the number of gears from the sensor, and to control the motor responsive to the number of remote commands.

The plurality of magnets may be eight magnets disposed about the periphery of the one gear of the number of gears.

The gear box assembly may further comprise a metal enclosure enclosing the number of gears therein; the plurality of magnets may be disposed about the periphery of the one gear of the number of gears; and the sensor may be disposed external to the metal enclosure and proximate the periphery of the one gear of the number of gears.

As another aspect of the disclosed concept, a network protector enclosure comprises: an electrical enclosure including an inner volume and a door structured to open to expose the inner volume and structured to close to enclose the inner volume; a racking mechanism disposed in the inner volume of the electrical enclosure, the racking mechanism including a lead screw rotatable in a first rotational direction to a first position and an opposite second rotational direction to a different second position; a network protector carried by the racking mechanism and being movable thereby between a connect position in the inner volume of the electrical enclosure corresponding to the first position of the lead screw of the racking mechanism, and a test position in the inner volume of the electrical enclosure corresponding to the different second position of the lead screw of the racking mechanism; and a remote control mechanism structured to rotate the lead screw of the racking mechanism between the first position and the different second position of the lead screw responsive to a number of remote commands.

The sensor may be a magneto-resonant sensor structured to determine the position of the one gear by magnetic fields through the metal enclosure from the magnets.

The racking mechanism may further include a fully engaged position and a test position; and the controller may further comprise a routine responsive to a plurality of inputs to cause the controller to learn the fully engaged position and the test position as a function of counts from the sensor.

The remote control mechanism may further comprise a user interface cooperating with the controller to provide the number of remote commands.

As another aspect of the disclosed concept, an automatic racking system comprises: a motor; a gear box assembly driven by the motor, the gear box assembly comprising a number of gears having a position, an output shaft driven by the number of gears, and a plurality of magnets disposed about one gear of the number of gears; a sensor responsive to the plurality of magnets; and a controller including an input from the sensor, and an output to power the motor, the controller being structured to determine the position of the one gear of the number of gears from the sensor, and to control the motor responsive to a number of remote commands.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "processor" means a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; or any suitable processing device or apparatus.

The disclosed concept is described in association with network protectors, although some embodiments of the disclosed concept are applicable to a wide range of draw-out electrical switching apparatus, such as circuit breakers.

Figure 1:
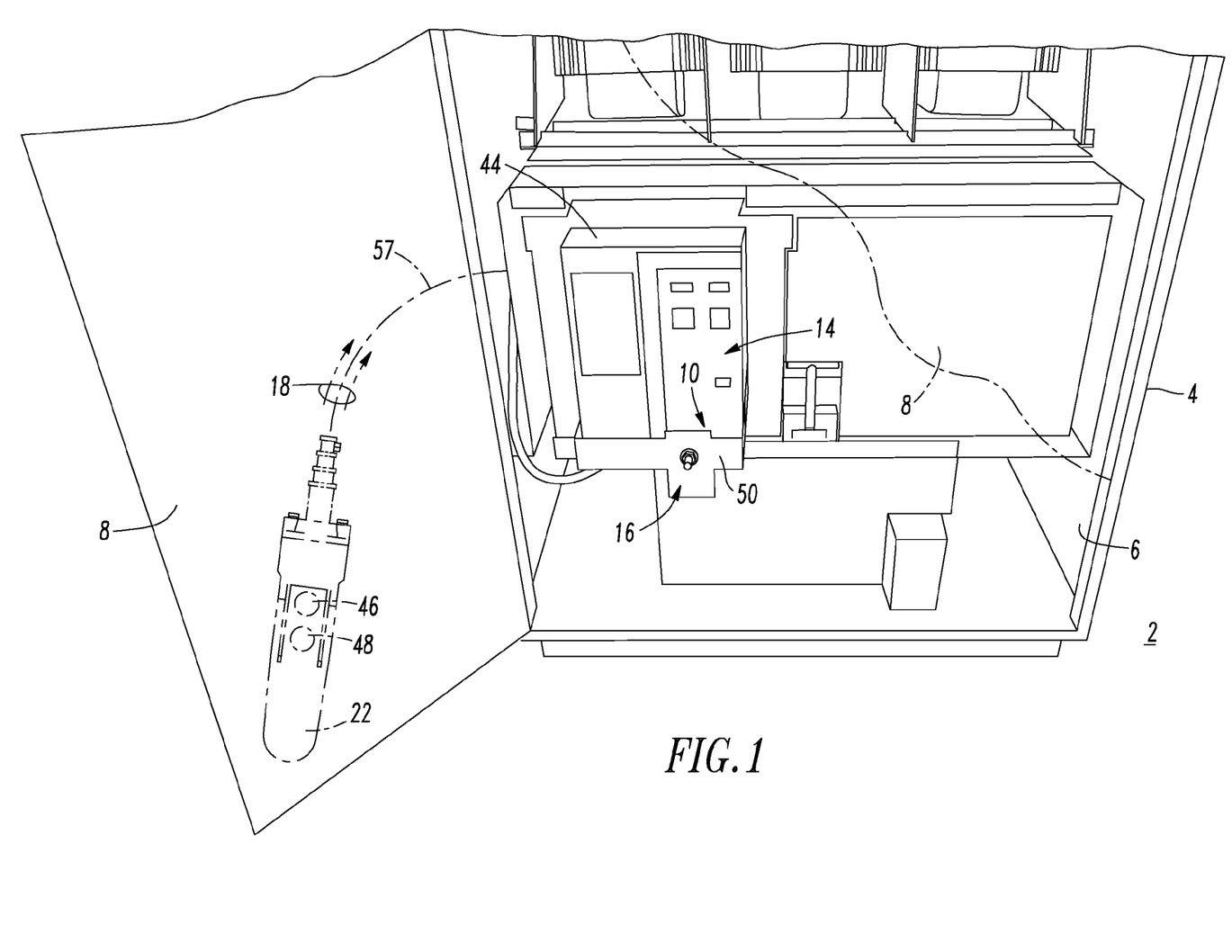
FIG. 1 is an isometric view of an electrical enclosure including a network protector and a remote racking device in accordance with embodiments of the disclosed concept.
Figure 2:
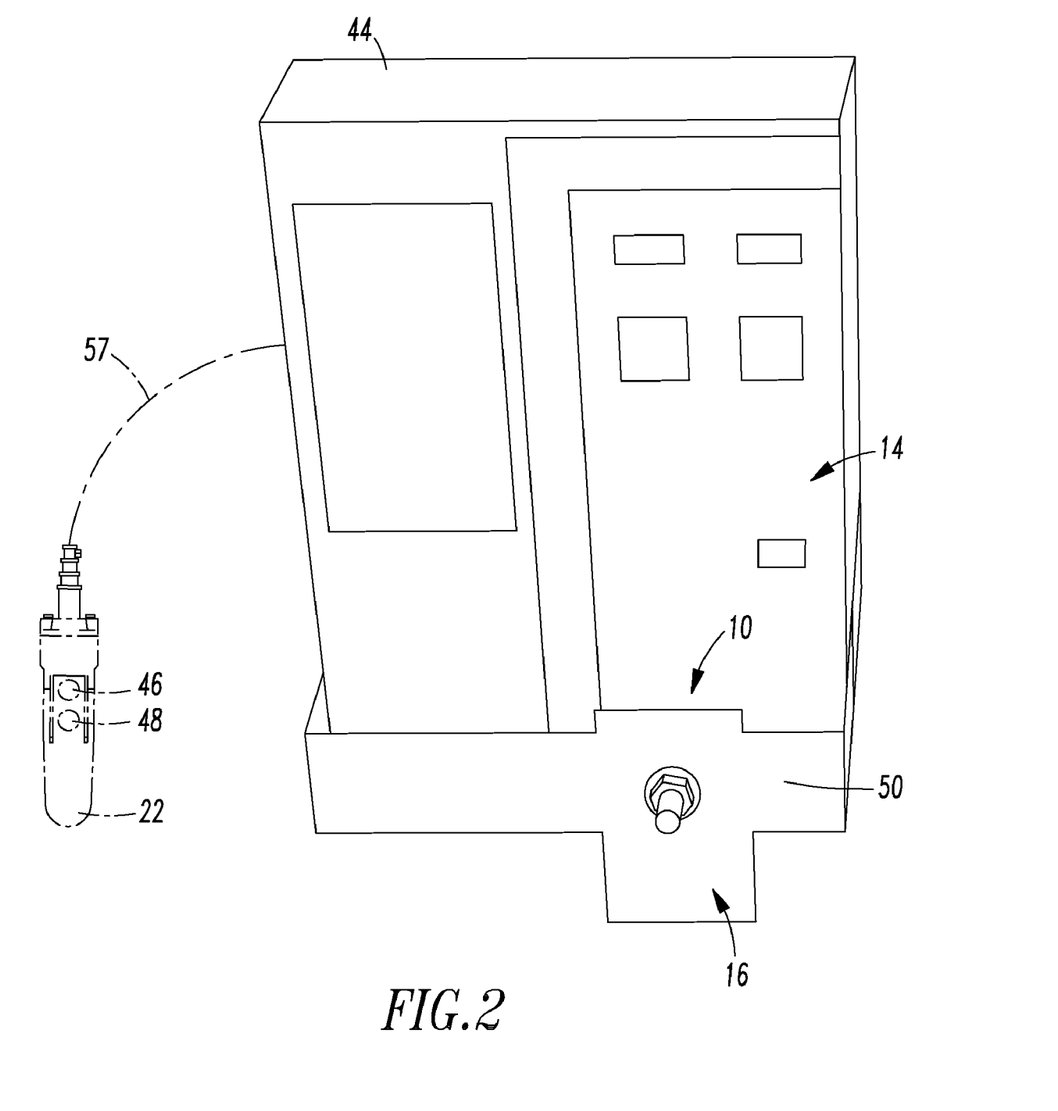
FIG. 2 is an isometric view of a network protector and a remote racking device in accordance with embodiments of the disclosed concept.

Referring to FIG. 1, a system 2 includes an electrical enclosure 4 having an inner volume 6 and a door 8 structured to open to expose the inner volume 6 and structured to close (as shown in phantom line drawing) to enclose the inner volume 6. A racking mechanism 10 (best shown in FIG. 8) is disposed in the inner volume 6 of the electrical enclosure 4. The racking mechanism 10 includes a member 12 (shown in FIG. 8) movable in a first direction to a first position and an opposite second direction to a different second position as will be explained, below, in connection with Example 1 and in connection with FIGS. 6 and 7. A network protector 14 is carried by the racking mechanism 10 and is movable thereby between a CONNECT position (FIG. 6) in the inner volume 6 of the electrical enclosure 4 corresponding to the first position of the racking mechanism member 12, and a TEST position (FIG. 7) in the inner volume 6 of the electrical enclosure 4 corresponding to the different second position of the racking mechanism member 12. A control mechanism 16 (FIG. 3) is structured to move the racking mechanism member 12 between the first position and the different second position thereof responsive to a number of remote commands 18.

EXAMPLE 1

For example, the system 2 can be a network protector enclosure 2. The racking mechanism member 12 can be a lead screw 12 rotatable in a first rotational direction to a first position thereof and an opposite second rotational direction to a different second position thereof. The control mechanism 16 can be a remote control mechanism 16 structured to rotate the lead screw 12 between the first position and the different second position thereof responsive to the number of remote commands 18.

EXAMPLE 2

The remote control mechanism 16 can include a controller 20 (FIG. 3), such as a processor, and a user interface 22 (shown in phantom line drawing in FIG. 1) cooperating with the controller 20 to provide the number of remote commands 18. The controller 20 can be structured to cooperate with the remote user interface 22, which provides the number of remote commands 18. Alternatively, the controller 20 can be activated via a remote switch (not shown), from any suitable user interface, such as, for example, a pendant station (not shown), or by any suitable remote communications.

EXAMPLE 3

Figure 3:
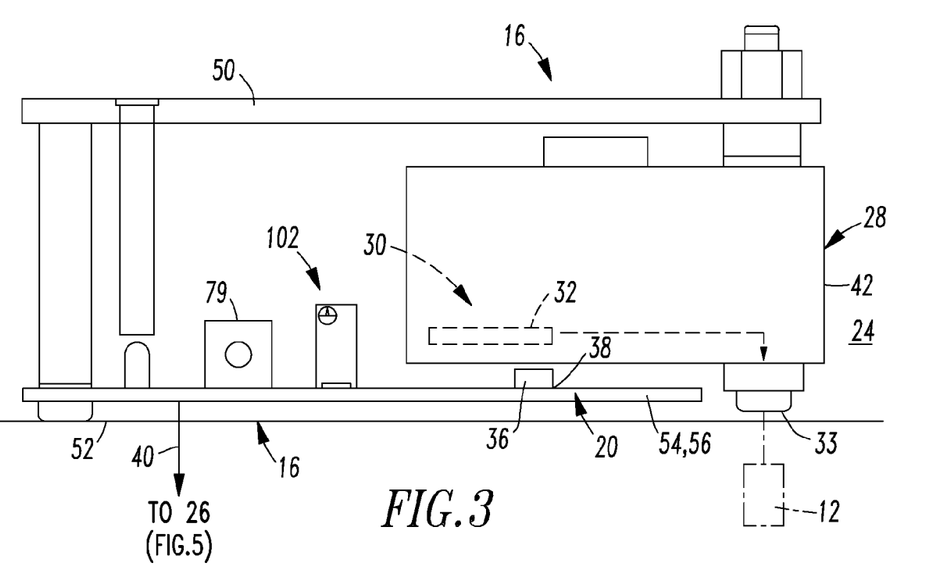
FIG. 3 is a top plan view of the remote racking device of FIG. 2.
Figure 4:
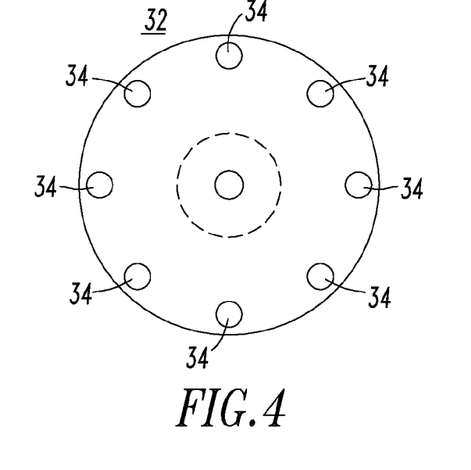
FIG. 4 is a vertical elevation view of one of the gears of the gear box of FIG. 3.
Figure 5:
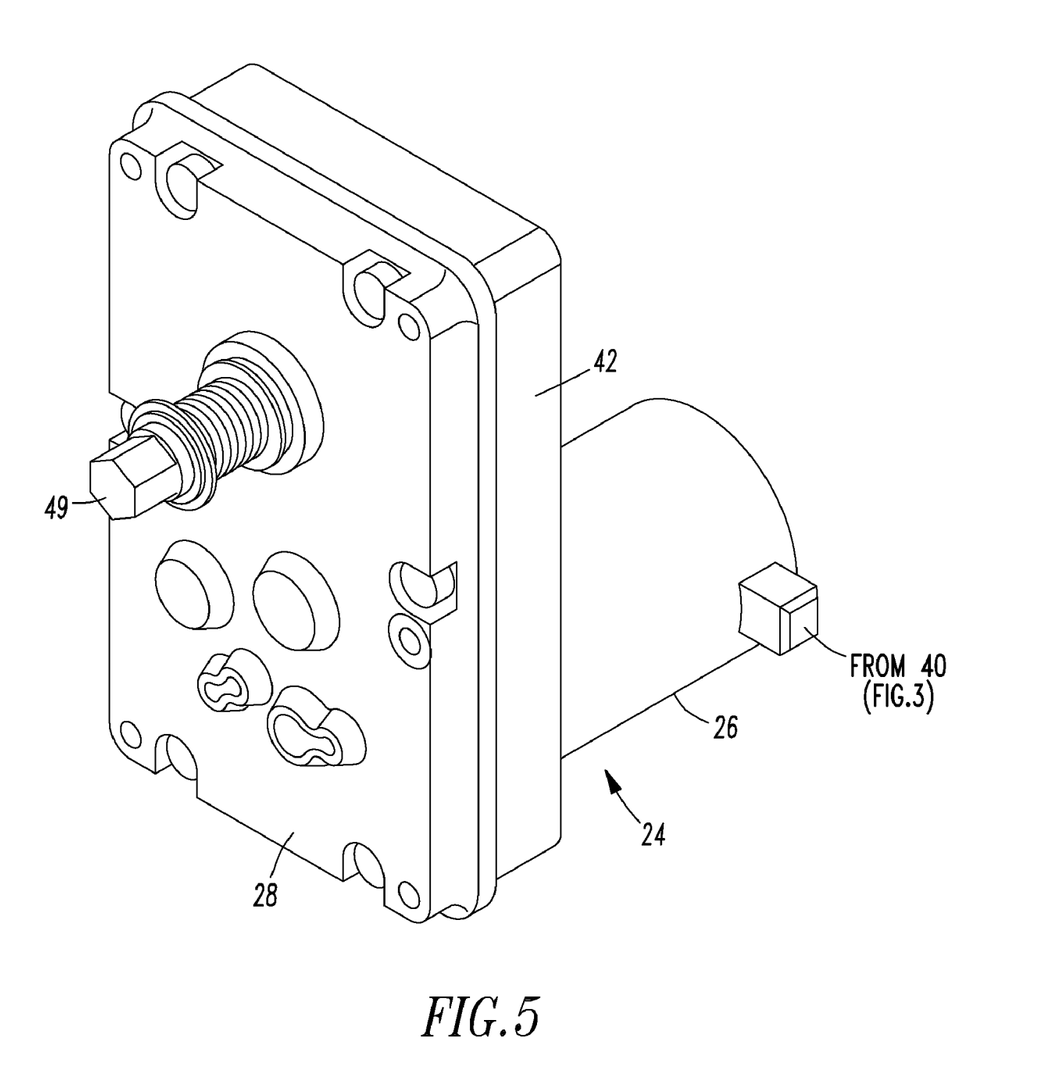
FIG. 5 is an isometric view of the gear box of FIG. 3 including an associated motor.

Referring to FIGS. 3-5, the remote control mechanism 16 can be an automatic racking system 24 including a motor 26 (FIG. 5) and a gear box assembly 28 driven by the motor 26. The gear box assembly 28 includes a number of gears 30, such as gear 32 having a position, an output shaft 33 driven by the number of gears 30, and a plurality of magnets 34 (FIG. 4) disposed about the gear 32. A sensor 36 is responsive to the plurality of magnets 34. The controller 20 includes an input 38 from the sensor 36, and an output 40 to power the motor 26. The controller 20 is structured to determine the position of the gear 32 from the sensor 36, and to control the motor 26 responsive to the number of remote commands 18 (FIG. 1).

EXAMPLE 4

As shown in FIGS. 3 and 4, the gear box assembly 28 can include a metal enclosure 42 enclosing the number of gears 30 therein. The plurality of magnets 34 can be disposed about the periphery of the example gear 32. The sensor 36 can be disposed external to the metal enclosure 42 and proximate the periphery of the example gear 32.

EXAMPLE 5

Figure 6:
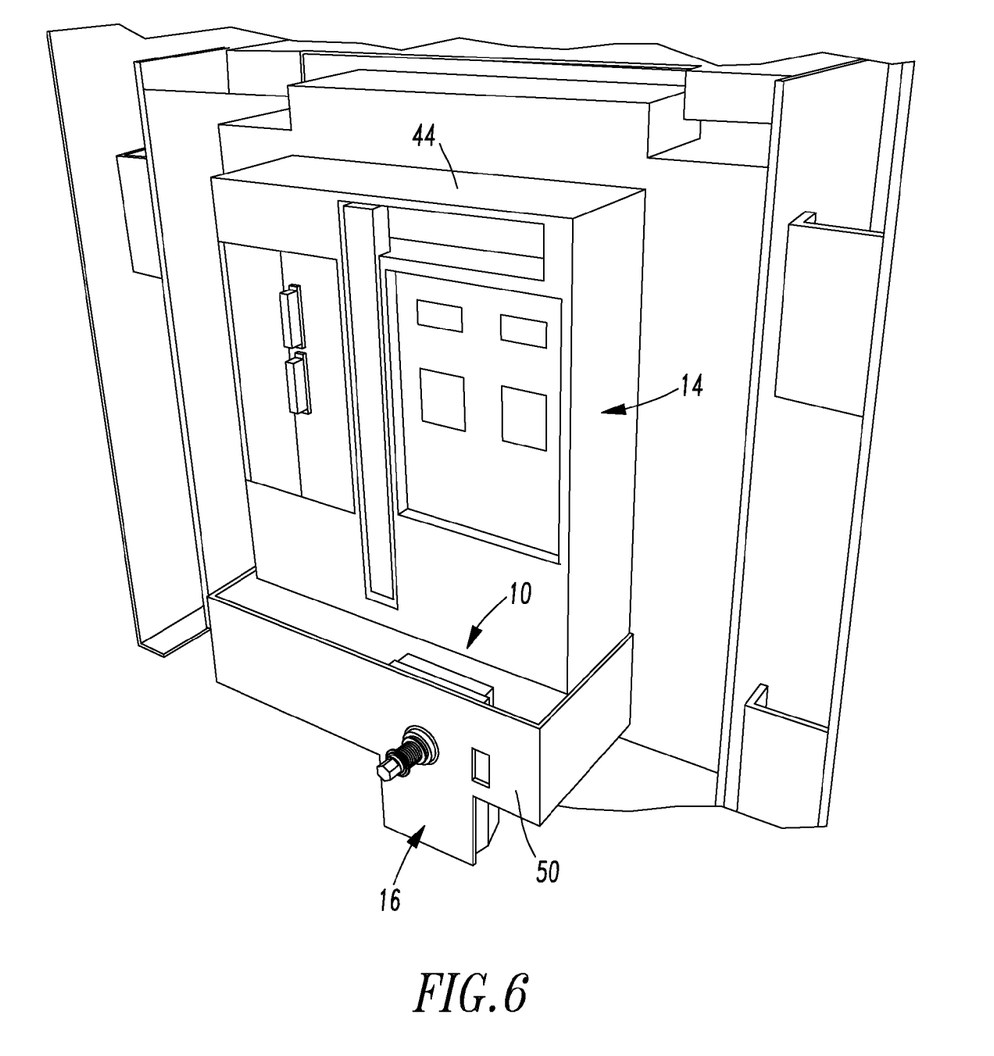
FIGS. 6 and 7 are isometric views of the electrical enclosure, network protector and remote racking device of FIG. 1 in the connected and test positions, respectively.
Figure 7:
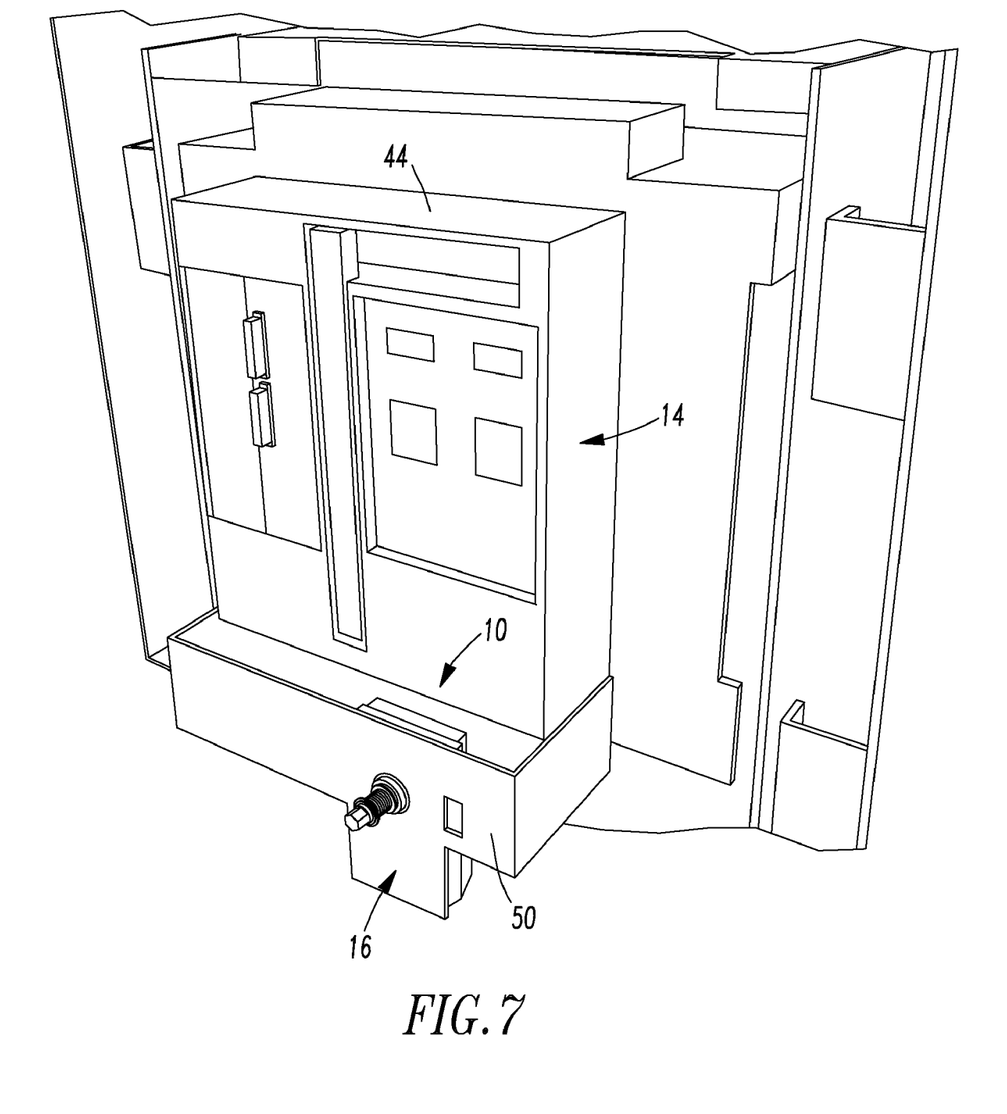
Figure 8:
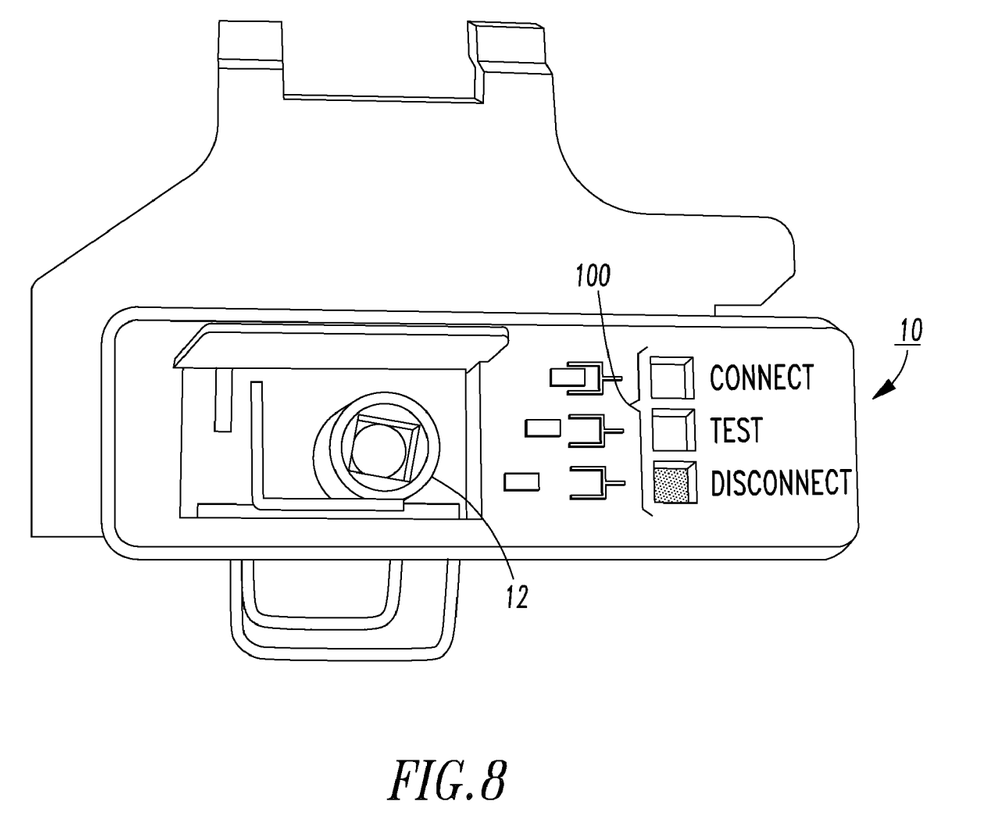
FIG. 8 is an isometric view of a portion of the network protector of FIG. 1 with a shutter in a raised position to show the lead screw.

The controller 20 verifies the position (e.g., as shown in FIG. 6 or FIG. 7) of the network protector circuit breaker 44 in the following manner. The controller 20 counts revolutions of the example gear 32 (e.g., without limitation, eight of the magnets 34 per revolution) in the remote racking gear box assembly 28. The controller 20 employs, for example and without limitation, a suitable magneto-resistive sensor 36 (e.g., without limitation, a 2SS52M Series digital magneto-resistive sensor marketed by Honeywell Inc. of Freeport, Ill.) to update the count. For example and without limitation, the pulse count can be updated for each transition of the output of the sensor 36 to a "0" state.

EXAMPLE 6

The controller 20 can be a microcontroller-based device which controls the motor 26 and, thus, the gear box assembly 28 that drives the lead screw 12. The network protector circuit breaker 44 is mechanically linked to the lead screw 12 in order that when the lead screw 12 turns, the network protector circuit breaker 44 moves in a linear fashion. If the lead screw 12 is turned clockwise (with respect to FIG. 8), then the network protector circuit breaker 44 will move toward the "fully engaged" or CONNECT position (FIG. 6). Otherwise, if the lead screw 12 is turned counter-clockwise (with respect to FIG. 8), then the network protector circuit breaker 44 will move toward a TEST position (FIG. 7), as will be explained. By controlling the direction of the motor 26, the network protector circuit breaker 44 can be moved between the CONNECT position and the TEST position. By measuring (or counting) the number of lead screw shaft revolutions, the network protector circuit breaker position along the lead screw 12 can be accurately determined. For example, an operator can employ the user interface 22 (FIG. 1) that has buttons (e.g., IN button 46 and OUT button 48) to control the positioning of the network protector circuit breaker 44. Alternatively, the user can manually position the network protector circuit breaker 44 by pressing the member 49 (FIG. 5), which releases the motor 26 from the motor gear box assembly 28, and then manually cranking the member 49 (e.g., with a suitable tool) to draw-in or draw-out the network protector circuit breaker 44.

EXAMPLE 7

As shown in FIG. 4, the plurality of magnets 34 can be eight example magnets 34 disposed about the periphery of the example gear 32. The sensor 36 (FIG. 3) can be a magneto-resonant sensor structured to determine the position of the example gear 32 by magnetic fields through the metal enclosure 42 from the magnets 34. The motor 26 (FIG. 5) and gear box assembly 28 are specifically structured for the automatic racking system 24. The sensor 36 senses the magnets 34 and the controller 20 counts the rotation of the example gear 32 in order to determine speed and location. The example main gear 32 drives the output shaft 33, which is mated to the lead screw 12. This allows the controller's magneto-resistive sensor 36 to detect, for example, eight pulses per revolution of the lead screw 12. The magnets 34 have sufficient strength in order that the magneto-resistive sensor 36 is advantageously able to detect the magnetic fields through, for example, the example aluminum wall of the gear box housing 42.

EXAMPLE 8

As shown in FIG. 3, the controller 20 is mounted to a metal bracket 50 on one side of the motor gear box assembly 28 between a plastic front panel bezel 52 and the metal bracket 50 that holds the gear box assembly 28. The mounting of the controller 20 is such that the magneto-resistive sensor 36 is physically located to align with the passing magnets 34 of the gear 32 inside the gear box housing 42.

EXAMPLE 9

Also referring to FIGS. 6 and 7, the racking mechanism 10 includes the CONNECT position and the TEST position, respectively. The controller 20 can include routines 54 (FIGS. 9) and 56 (FIG. 10) responsive to input of the number of remote commands 18 (FIG. 1). For example, the routine 56 can cause the controller 20 to learn the CONNECT position and the TEST position as a function of counts from the sensor 36.

EXAMPLE 10

The output shaft 33 (FIG. 3) is structured to drive the lead screw 12 (shown in phantom line drawing in FIG. 3) of the racking mechanism 10. The controller 20 of the automatic racking system 24 automatically engages and disengages the network protector circuit breaker 44 using the motorized lead screw 12. The automatic racking system 24 can be activated (rack-in to bus work (not shown) or rack-out from energized bus work) through a suitable user interface, such as 22 (FIG. 1) (e.g., without limitation, a push button remote station; a hand held pendant station including an umbilical cord 57, and rack-in and rack-out buttons 46,48). The umbilical cord 57 is electrically connected to a suitable interface (e.g., without limitation, side electrical junction box (not shown)) of the electrical switching apparatus (e.g., without limitation, the network protector 14). Alternatively, the automatic racking system 24 can be operated by communications using an addressable relay (not shown), which can switch a number of plural discrete contacts upon receipt of suitable commands from a communication network, bus or other communication link (not shown).

EXAMPLE 11

The network protector circuit breaker 44 has the following example positions: (1) CONNECT (FIG. 6) in which the enclosure door 8 (FIG. 1) remains closed on the network protector 14 which physically engages the stabs (not shown) of a potentially energized bus work (not shown) from a transformer (not shown) and network (not shown); (2) TEST (FIG. 7) in which the enclosure door 8 remains closed on the network protector 14 which has moved a suitable distance (e.g., without limitation, about 1.5 inches) away from the energized bus work, but with the electrical secondary control wiring (not shown) from the network protector circuit breaker 44 to the relay control panel (not shown) still being connected; (3) DISCONNECT (not shown) in which the network protector circuit breaker 44 is further withdrawn and the electrical secondary control wiring is disconnected; and (4) WITHDRAWN (not shown) in which the network protector circuit breaker 44 is physically extended to the furthest point on the rails (not shown) for removal from the corresponding enclosure 4. In the latter two positions, the enclosure door 8 must be opened to expose the network protector circuit breaker 44.

The disclosed automatic racking system 24 takes the network protector circuit breaker 44 from the CONNECT position to the TEST position and vice versa. The example moving distance is about 1.5 inches from the energized bus work (not shown). The network protector circuit breaker 44 has the four example positions as discussed above.

EXAMPLE 12

Figure 9:
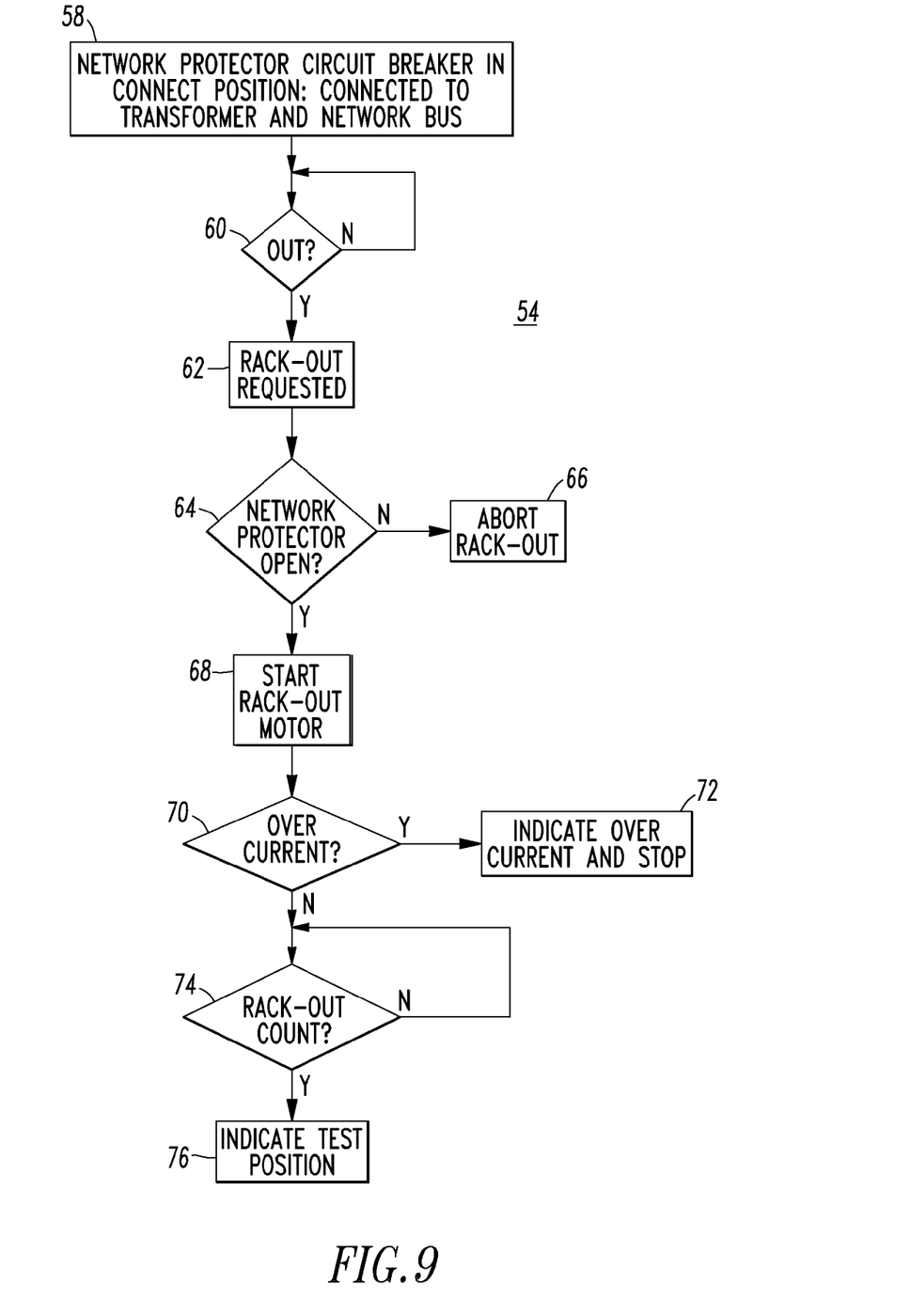
FIGS. 9 and 10 are flowcharts of routines of the controller of the remote racking device of FIG. 3.

FIG. 9 is a flowchart of one routine 54 of the controller 20, which is employed to move the network protector circuit breaker 44 from the CONNECT position to the TEST position. Initially, at 58, the network protector circuit breaker 44 is in the CONNECT position. At 60, it is determined if an OUT command is requested. If not, then step 60 is repeated. Otherwise, if the OUT command is requested, then a rack-out operation is requested at 62. Next, at 64, it is determined if the network protector 14 is open (e.g., from the state of an auxiliary switch (not shown) of the network protector circuit breaker 44). If not, then at 66, the rack-out operation is aborted. Otherwise, at 68, the rack-out motor 26 (FIG. 5) is started in the rack-out direction. Next, at 70, the controller 20 determines (e.g., without limitation, employing a suitable current sensor (not shown)) if there is an over current condition of the motor 26. If so, then at 72, the over current condition is indicated and the motor 26 is stopped. Otherwise, if the motor current is acceptable, then, at 74, it is determined if a predetermined rack-out count is reached. If not, then step 74 is repeated. Otherwise, at 76, the TEST position is indicated and the motor 26 is stopped.

EXAMPLE 13

Figure 10:
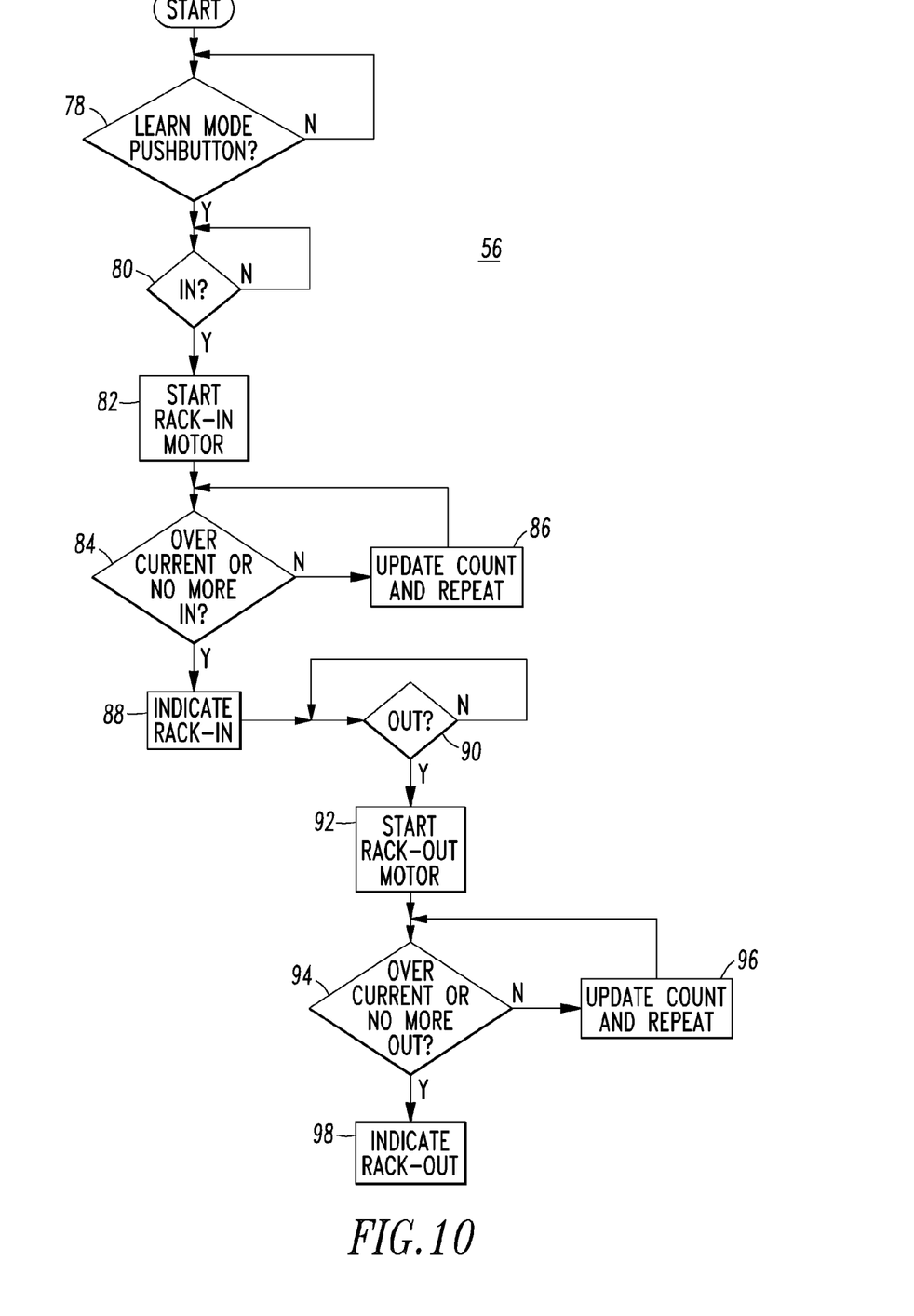

FIG. 10 is a flowchart of the auto-learn routine 56 of the controller 20. After starting, at 78, it is determined if a learn mode pushbutton 79 (FIG. 3) is depressed. If not, then step 78 is repeated. Otherwise, at 80, it is determined if an IN command is requested. If not, then step 80 is repeated. Otherwise, if the IN command is requested, then, at 82, the rack-in motor 26 (FIG. 5) is started in the rack-in direction. Next, at 84, the controller 20 determines (e.g., without limitation, employing a suitable current sensor (not shown)) if there is an over current condition of the motor 26. If not, then at 86, the count from the sensor 36 is updated and step 84 is repeated. Otherwise, if the motor current is over current, then, at 88, a rack-in state is indicated. Next, at 90, it is determined if an OUT command is requested. If not, then step 90 is repeated. Otherwise, at 92, the rack-out motor 26 (FIG. 5) is started in the rack-out direction. Next, at 94, the controller 20 determines (e.g., without limitation, employing a suitable current sensor (not shown)) if there is an over current condition of the motor 26. If not, then at 96, the count from the sensor 36 is updated and step 94 is repeated. Otherwise, if the motor current is over current, then, at 98, a rack-out state is indicated.

As an alternative to or in addition to steps 84 and 94, the controller 20 can detect if the learn mode pushbutton 79 is depressed and advance to respective steps 88 or 98.

EXAMPLE 14

The auto-learn routine 56 of FIG. 10 responds to the IN command, OUT command and learn mode pushbutton 79 to cause the controller 20 to learn the CONNECT position and the TEST position as a function of counts from the sensor 36. The corresponding counts can be stored in a suitable memory (not shown) of the controller 20, such as a non-volatile memory. As a result, the controller 20 does not employ any micro-switches.

When power is applied to the controller 20, it begins monitoring three inputs: (1) the learn mode pushbutton 79; (2) a remote command 18 for the IN button 46 of the user interface 22; and (3) a remote command 18 for the OUT button 48 of the user interface 22. If the learn mode pushbutton 79 on the controller 20 is pressed, then a YELLOW "Learn Mode" LED (not shown) is illuminated and the controller 20 enters a LEARN MODE. When the controller 20 is initially installed with the network protector 14, the LEARN MODE is used to program (i.e., "teach") the controller 20 the exact location of the CONNECT and TEST positions. The LEARN MODE operates as follows. First, the operator presses the learn mode pushbutton 79 on the controller 20. The controller 20 illuminates the "Learn Mode" LED and enters the LEARN MODE. Next, the operator uses the IN and OUT buttons 46,48 to position the network protector circuit breaker 44 exactly at the CONNECT position. When the IN button 46 is pressed, the network protector circuit breaker 44 moves toward the CONNECT position; when the OUT button 48 is pressed, the network protector circuit breaker 44 moves toward the TEST position. If a button 46,48 is pressed momentarily, then the controller 22 turns the lead screw 12 one-eighth of a turn and stops. If a button 46,48 is pressed and held down, then the controller 22 turns the lead screw 12 at full speed. The operator can refer to a visual flag 100 (FIG. 8) on the network protector circuit breaker 44 and use the buttons 46,48 to precisely position the network protector circuit breaker 44 at the CONNECT position. When the network protector circuit breaker 44 is at the CONNECT position, the operator can press the learn mode pushbutton 79 to "store" this position into the controller's non-volatile memory. The "Learn Mode" LED flashes to indicate that this position has been stored.

Finally, the operator uses the IN and OUT buttons 46,48 to position the network protector circuit breaker 44 exactly at the TEST position. When the IN button 46 is pressed, the network protector circuit breaker 44 moves toward the CONNECT position; when the OUT button 48 is pressed, the network protector circuit breaker 44 moves toward the TEST position. If a button 46,48 is pressed momentarily, then the controller 20 turns the lead screw 12 one-eighth of a turn and stops. If a button 46,48 is pressed and held down, then the controller 20 turns the lead screw 12 at full speed. The operator can refer to the visual flag 100 (FIG. 8) on the network protector circuit breaker 44 and use the buttons 46,48 to precisely position the network protector circuit breaker 44 at the TEST position. When the network protector circuit breaker 44 is at the TEST position, the operator can press the learn mode pushbutton 79 on the controller 20 to "store" this position into the controller's non-volatile memory. The "Learn Mode" LED flashes to indicate that this position has been stored. The controller 20 then turns off the "Learn Mode" LED and exits the LEARN MODE.

If the IN button 46 is pressed momentarily (the buttons 46,48 do not need to be held in the pressed position), then the controller 20 compares the present position of the network protector circuit breaker 44 on the lead screw 12 (based on magnetic pulse counts) with the position of the network protector circuit breaker 44 at the CONNECT position (this was the magnetic pulse count that was stored in the controller 20 when in the LEARN MODE). If the network protector circuit breaker 44 is not already at the CONNECT position, then the controller 20 illuminates an "In Motion" LED (not shown) and applies a suitable voltage to the motor 26 to cause the lead screw 12 to turn and move the network protector circuit breaker 44 toward the CONNECT position. As the network protector circuit breaker 44 moves, the controller 12 counts pulses from the magneto-resistive sensor 36 and stops when the network protector circuit breaker 44 exactly reaches the CONNECT position. The controller 20 then turns off the "In Motion" LED and illuminates an "Engaged" LED (not shown). If the network protector circuit breaker 44 is already at the CONNECT position when the IN button 46 is pressed, no network protector circuit breaker motion occurs.

If the OUT button 48 is pressed momentarily (the buttons 46,48 do not need to be held in the pressed position), then the controller 20 compares the present position of the network protector circuit breaker 44 on the lead screw 12 (based on magnetic pulse counts) with the position of the network protector circuit breaker 44 at the TEST position (this was the magnetic pulse count that was stored in the controller 20 when in the LEARN MODE). If the network protector circuit breaker 44 is not already at the TEST position, then the controller 20 illuminates the "In Motion" LED and applies a suitable voltage to the motor 26 to cause the lead screw 12 to turn and move the network protector circuit breaker 44 toward the TEST position. As the network protector circuit breaker 44 moves, the controller 20 counts pulses from the magneto-resistive sensor 36 and stops when the network protector circuit breaker 44 exactly reaches the TEST position. The controller 20 then turns off the "In Motion" LED and illuminates an "At Test" LED (not shown). If the network protector circuit breaker 44 is already at the TEST position when the OUT button 48 is pressed, no network protector circuit breaker motion occurs.

EXAMPLE 15

The inputs to the controller 20 include: (1) a magnetic field for the magneto-resistive sensor 36; (2) the IN button 46 (e.g., without limitation, a dry-contact input); (3) the OUT button 48 (e.g., without limitation, a dry-contact input); and (4) a suitable line voltage (e.g., without limitation, 120 VAC, 50/60 Hz, which is used to power the controller 20 and to generate the DC voltage used to drive the motor 26).

The outputs from the controller 20 include: (1) a DC voltage to the motor 26 (e.g., without limitation, two conductors provide 120 VDC); (2) two dry-contact terminals (e.g., without limitation, rated at 250 VAC @ 4 A that close when the CONNECT position is reached; closing of these contacts corresponds to the illumination of the "Fully Engaged" indicator LED); (3) two dry-contact terminals (e.g., without limitation, rated at 250 VAC @ 4 A that close when the TEST position is reached; closing of these contacts corresponds to the illumination of the "At Test"indicator LED); and (4) two dry-contact terminals (e.g., without limitation, rated at 250 VAC @ 4 A that close when power is applied to the controller 20; these remain closed as long as power is applied to the controller 20; closing corresponds to the illumination of the "Power On" indicator LED).

Five LED indicators (not shown) on the controller 20 include: (1) Power On (e.g., without limitation, GREEN); (2) network protector circuit breaker 44 "In Motion" (e.g., without limitation, RED); (3) network protector circuit breaker 44 at TEST position (e.g., without limitation, YELLOW); (4) network protector circuit breaker 44 at CONNECT position (e.g., without limitation, GREEN); and (5) controller 20 in "Learn Mode" (e.g., without limitation, YELLOW).

Connections to the controller 20 include: (1) AC line in hot (black); (2) AC line in neutral (white); (3) motor "+" terminal; (4) motor "−" terminal; (5) user interface common; (6) OUT button (gray); (7) IN button (blue); (8) dry contacts (2 inputs) for "At Test" function; (9) dry contacts (2 inputs) for "Fully Engaged"function; and (10) dry contacts (2 inputs) for "Power On" function.

EXAMPLE 16

Preferably, a suitable current sensing circuit 102 (FIG. 3) is employed to detect the CONNECT position on a rack-in operation during the LEARN MODE, or to detect a stall condition on both rack-in and rack-out operations. Whenever the motor current rises above a predetermined (and preferably adjustable) threshold, the motor 26 is stopped. For example, the current sensing circuit 102 can include a suitable adjustment (e.g., without limitation, an adjustable potentiometer) that is set at the factory to allow the motor 26 to stop running if an unexpected stop is encountered anywhere in the example about 1.5 inches of travel.

EXAMPLE 17

A non-limiting example of the user interface 22 is a 60 Series Pistol Grip Pendant, Part No. 34211, marketed by Conductix-Wampfler of Omaha, Nebr.

EXAMPLE 18

The cord 57 from the user interface 22 and a 120 VAC power cord (not shown) connect to a junction box (not shown)

that is near the bottom center of the side of the network protector tank. Those leads (and an additional group of indicating wires) are run inside the network protector tank to a suitable connector or plug (not shown) on the bottom of the automatic racking system 24.

The disclosed automatic racking system 24 provides both safety and connectivity. This permits the remote racking out of the network protector 14 off mating stabs (not shown) without opening the door 8 of the network protector enclosure 4 and without entering the corresponding underground vault or enclosure (not shown).

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A system comprising:
   an electrical enclosure including an inner volume and a door structured to open to expose the inner volume and structured to close to enclose the inner volume;
   a racking mechanism disposed in the inner volume of said electrical enclosure, said racking mechanism including a member movable in a first direction to a first position and an opposite second direction to a different second position;
   a network protector carried by said racking mechanism and being movable thereby between a connect position in the inner volume of said electrical enclosure corresponding to the first position of the member of said racking mechanism, and a test position in the inner volume of said electrical enclosure corresponding to the different second position of the member of said racking mechanism; and
   an automatic control mechanism structured to move the member of said racking mechanism between the first position and the different second position of said member responsive to a number of remote commands.

2. A system comprising:
   an electrical enclosure including an inner volume and a door structured to open to expose the inner volume and structured to close to enclose the inner volume;
   a racking mechanism disposed in the inner volume of said electrical enclosure, said racking mechanism including a member movable in a first direction to a first position and an opposite second direction to a different second position;
   a network protector carried by said racking mechanism and being movable thereby between a connect position in the inner volume of said electrical enclosure corresponding to the first position of the member of said racking mechanism, and a test position in the inner volume of said electrical enclosure corresponding to the different second position of the member of said racking mechanism; and
   a control mechanism structured to move the member of said racking mechanism between the first position and the different second position of said member responsive to a number of remote commands,
   wherein said control mechanism comprises:
   a motor;
   a gear box assembly driven by said motor, said gear box assembly comprising a number of gears having a position, an output shaft driven by said number of gears, and a plurality of magnets disposed about one gear of said number of gears;
   a sensor responsive to said plurality of magnets; and
   a controller including an input from said sensor, and an output to power said motor, said controller being structured to determine the position of said one gear of said number of gears from said sensor, and to control said motor responsive to said number of remote commands.

3. The system of claim 2 wherein said member is a rotatable lead screw.

4. The system of claim 2 wherein said plurality of magnets are eight magnets disposed about the periphery of said one gear of said number of gears.

5. The system of claim 2 wherein said gear box assembly further comprises a metal enclosure enclosing said number of gears therein; wherein said plurality of magnets are disposed about the periphery of said one gear of said number of gears; and wherein said sensor is disposed external to said metal enclosure and proximate the periphery of said one gear of said number of gears.

6. A network protector enclosure comprising:
   an electrical enclosure including an inner volume and a door structured to open to expose the inner volume and structured to close to enclose the inner volume;
   a racking mechanism disposed in the inner volume of said electrical enclosure, said racking mechanism including a lead screw rotatable in a first rotational direction to a first position and an opposite second rotational direction to a different second position;
   a network protector carried by said racking mechanism and being movable thereby between a connect position in the inner volume of said electrical enclosure corresponding to the first position of the lead screw of said racking mechanism, and a test position in the inner volume of said electrical enclosure corresponding to the different second position of the lead screw of said racking mechanism; and
   an automatic remote control mechanism structured to rotate the lead screw of said racking mechanism between the first position and the different second position of said lead screw responsive to a number of remote commands.

7. A network protector enclosure comprising:
   an electrical enclosure including an inner volume and a door structured to open to expose the inner volume and structured to close to enclose the inner volume;
   a racking mechanism disposed in the inner volume of said electrical enclosure, said racking mechanism including a lead screw rotatable in a first rotational direction to a first position and an opposite second rotational direction to a different second position;
   a network protector carried by said racking mechanism and being movable thereby between a connect position in the inner volume of said electrical enclosure corresponding to the first position of the lead screw of said racking mechanism, and a test position in the inner volume of said electrical enclosure corresponding to the different second position of the lead screw of said racking mechanism and
   a remote control mechanism structured to rotate the lead screw of said racking mechanism between the first position and the different second position of said lead screw responsive to a number of remote commands,
   wherein said remote control mechanism comprises:
   a motor;
   a gear box assembly driven by said motor, said gear box assembly comprising a number of gears having a position, an output shaft driven by said number of gears, and a plurality of magnets disposed about one gear of said number of gears;

a sensor responsive to said plurality of magnets; and a controller including an input from said sensor, and an output to power said motor, said controller being structured to determine the position of said one gear of said number of gears from said sensor, and to control said motor responsive to said number of remote commands.

8. The network protector enclosure of claim 7 wherein said gear box assembly further comprises a metal enclosure enclosing said number of gears therein; wherein said plurality of magnets are disposed about the periphery of said one gear of said number of gears; and wherein said sensor is disposed external to said metal enclosure and proximate the periphery of said one gear of said number of gears.

9. The network protector enclosure of claim 7 wherein said gear box assembly further comprises a metal enclosure enclosing said number of gears therein; wherein said plurality of magnets are disposed about the periphery of said one gear of said number of gears; and wherein said sensor is a magneto-resonant sensor structured to determine the position of said one gear by magnetic fields through said metal enclosure from said magnets.

10. The network protector enclosure of claim 7 wherein said racking mechanism further includes a fully engaged position and a test position; and wherein said controller further comprises a routine responsive to a plurality of inputs to cause said controller to learn said fully engaged position and said test position as a function of counts from said sensor.

11. The network protector enclosure of claim 7 wherein said output shaft drives said lead screw.

12. The network protector enclosure of claim 7 wherein said sensor is a magneto-resonant sensor structured to determine the position of said one gear by magnetic fields from said magnets.

13. The network protector enclosure of claim 7 wherein said remote control mechanism further comprises a user interface cooperating with said controller to provide said number of remote commands.

14. An automatic racking system comprising:
a motor;
a gear box assembly driven by said motor, said gear box assembly comprising a number of gears having a position, an output shaft driven by said number of gears, and a plurality of magnets disposed about one gear of said number of gears;

a sensor responsive to said plurality of magnets; and a controller including an input from said sensor, and an output to power said motor, said controller being structured to determine the position of said one gear of said number of gears from said sensor, and to control said motor responsive to a number of remote commands.

15. The automatic racking system of claim 14 wherein said output shaft is structured to drive a lead screw of a racking mechanism.

16. The automatic racking system of claim 15 wherein said racking mechanism includes a fully engaged position and a test position; and wherein said controller further comprises a routine responsive to a plurality of inputs to cause said controller to learn said fully engaged position and said test position as a function of counts from said sensor.

17. The automatic racking system of claim 14 wherein said sensor is a magneto-resonant sensor structured to determine the position of said one gear by magnetic fields from said magnets.

18. The automatic racking system of claim 14 wherein said controller is further structured to cooperate with a remote user interface to provide said number of remote commands.

19. The automatic racking system of claim 14 wherein said gear box assembly further comprises a metal enclosure enclosing said number of gears therein; wherein said plurality of magnets are disposed about the periphery of said one gear of said number of gears; and wherein said sensor is a magneto-resonant sensor structured to determine the position of said one gear by magnetic fields through said metal enclosure from said magnets.

20. The automatic racking system of claim 14 wherein said gear box assembly further comprises a metal enclosure enclosing said number of gears therein; wherein said plurality of magnets are disposed about the periphery of said one gear of said number of gears; and wherein said sensor is disposed external to said metal enclosure and proximate the periphery of said one gear of said number of gears.

* * * * *